United States Patent

[11] 3,563,558

| [72] | Inventor | Kingsley A. Doutt<br>Alpena, Mich. |
|---|---|---|
| [21] | Appl. No. | 772,976 |
| [22] | Filed | Nov. 4, 1968 |
| [45] | Patented | Feb. 16, 1971 |
| [73] | Assignee | Scovill Manufacturing Company<br>Waterbury, Conn. |

[54] PISTON SEAL WITH DISTORTABLE RIBS
4 Claims, 3 Drawing Figs.

| [52] | U.S. Cl. | 277/205 |
|---|---|---|
| [51] | Int. Cl. | F15j 15/32 |
| [50] | Field of Search | 277/205–211 |

[56] References Cited
UNITED STATES PATENTS

| 2,907,596 | 10/1959 | Maha | 277/205 |
| 3,046,026 | 7/1962 | Burrows | 277/205X |
| 3,173,699 | 3/1965 | Nathan | 277/206 |

Primary Examiner—Laverne D. Geiger
Assistant Examiner—Robert I. Smith
Attorney—Webster B. Harpman ABSTRACT: A piston seal for a piston and cylinder assembly to effect sealing contact between the piston and the cylinder having oppositely disposed annular flanges inwardly of one side thereof and of a size resulting in the distortion of said flanges when said piston seal is installed on a piston and positioned in a cylinder whereby the annular ribs are moved into an undulating shape adding increased resiliency and shape retaining characteristics to the piston seal.

PATENTED FEB 16 1971 3,563,558

INVENTOR.
KINGSLEY A. DOUTT
BY
*W. B. Hanpman*
ATTORNEY

PISTON SEAL WITH DISTORTABLE RIBS

BACKGROUND OF THE INVENTION

1. Field of the Invention

This invention relates to piston and cylinder assemblies such as used in hydraulic and pneumatic power cylinder applications and wherein a piston is movably positioned in a cylindrical member and a suitable sealing device is installed on said piston to effectively seal said piston with respect to said cylinder.

2. Description of the Prior Art

Piston seals rings for piston and cylinder assemblies have heretofore been proposed in varying sizes, shapes and materials and have frequently utilized cross-sectional configurations intended to result in the direction of the peripheral portion of the piston seal radially toward the cylinder wall by reason of the fluid pressure engaging the same. Springs have been incorporated in these constructions and various materials including laminate structures have been proposed. Without exception such piston seals have had a relatively short life and have lost their effective shape or been moved out of effective positioning by the fluid pressures to which they are subjected.

Such prior art structures may be seen in Pat. 3,195,901; 2,686,402 and 2,511,386.

SUMMARY OF THE INVENTION

A piston seal ring for a piston and cylinder assembly comprising a resilient body member of annular configuration having a deep groove configuration in one side with the walls of the groove shaped to form oppositely disposed in turned and out turned flanges respectively relative to the position of the piston seal on a piston in a piston and cylinder assembly.

The in turned and out turned flanges being of a size in their preinstalled form that is larger than the area in which they are confined in their installed position so that distortion resulting in undulating shape of each of said flanges results upon installation and the resultant stiffening of the portions of the piston seal on either side of said groove.

DESCRIPTION OF THE PREFERRED EMBODIMENT

Figure 3:
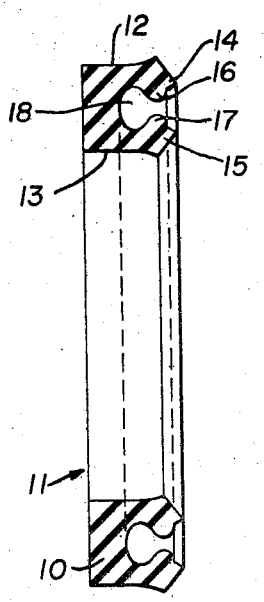
FIG. 3 is a vertical section through piston seal formed in accordance with the invention in preinstalled shape.

In its simplest form the piston seal of this invention consists of an annular member or ring 10 as seen in FIG. 3 of the drawings formed with a flat side, 11 circular outer and inner annular surfaces 12 an 13 respectively with the opposite side with respect to the flat side being formed in a pair of spaced flanges 14 and 15 which in turn are provided with oppositely disposed right angular secondary flanges 16 and 17. The configuration results from the formation of a deep annular groove 18 in the side of the piston seal opposite the flat unbroken side 11 and it will thus be seen that the seal in cross section as seen in FIG. 3 of the drawings in its preinstalled shape has an annular body of uniform cross section with a pair of sidewardly projecting spaced flanges 14 and 15 which in turn carry the opposed secondary flanges 16 and 17 on their opposite surfaces. The arcuate shape of the outermost and innermost arcuate surfaces 12 and 13 of the piston seal 10 is such that upon installation upon a piston 19 as seen in FIG. 1 of the drawing, the arcuate inner and outer surfaces 12 and 13 of the piston seal assume a flat right angular relation to the flat surface 11 of the piston seal as heretofore described.

This distortion of the flanges 14 and 15 is emphasized to a greater degree by the resultant distortion of the secondary flanges 16 and 17 and the same thereupon assume an undulating annular shape which adds considerable stiffness to the flanges 14 and 15 and thus insures the shape retention of the piston seal.

Figure 1:
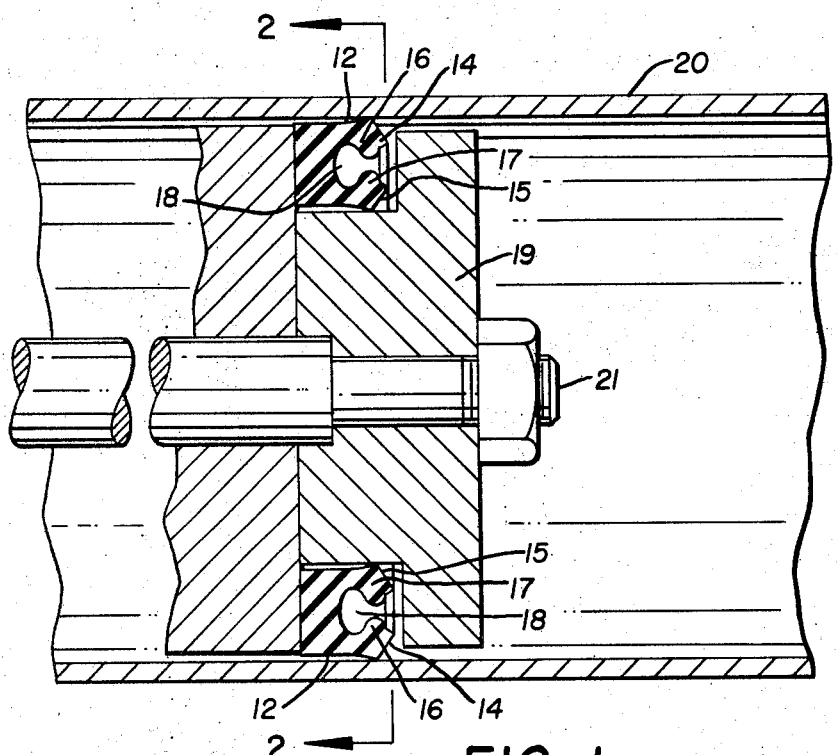
FIG. 1 is a cross-sectional elevation through a portion of a piston and cylinder assembly with parts broken away and parts in cross section and illustrating a piston seal ring on said piston. Broken lines indicate the distorted shape of portions of said seal.

In FIG. 1 of the drawings, the piston 19 is shown installed in a cylinder 20 and a piston rod 21 is engaged through the piston 19 and secured thereto by conventional means.

Those skilled in the art will observe that the cylinder is usually provided with appropriate heads and fluid inlet and outlet ports and that the piston is usually provided with a pair of the piston seals one adjacent each face thereof, all as conventional in the art.

The novelty in the present disclosure relates solely to the piston seal and its novel formation which results in the distortion of the secondary flanges 16 and 17 into annular configurations of undulating shape.

Figure 2:
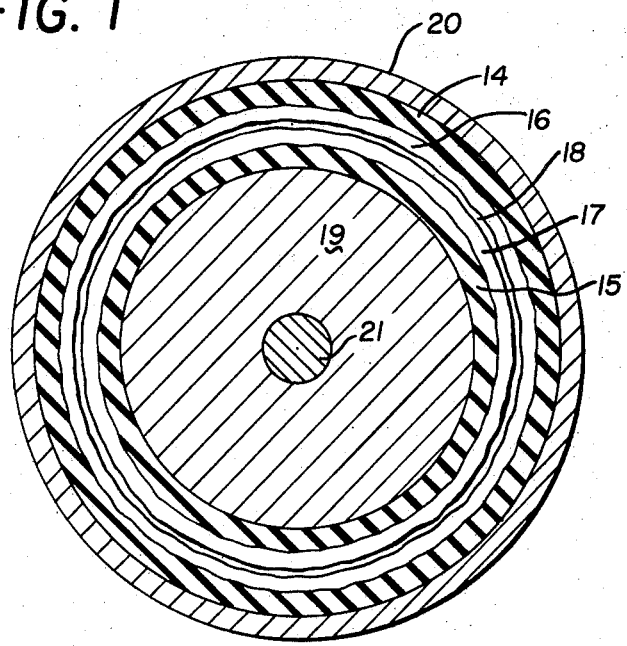
FIG. 2 is a vertical section on line 2-2 of FIG. 1.

In FIG. 2 of the drawings, a vertical section on line 2-2 may be seen and it will be observed that the secondary flanges 16 and 17 are illustrated in their installed undulating or distorted shape.

From the foregoing it will be seen that the piston seal disclosed herein results in a novel and highly desirable internal tension of the critical parts thereof when installed in its intended environment and that the distortion of the primary flanges 14 and 15 and the relatively greater distortion of the secondary flanges 16 and 17 provide a structure capable of maintaining its desired resiliency and tension and shape.

Although but one embodiment of the present invention has been illustrated and described, it will be apparent to those skilled in the art that various changes and modifications may be made therein without departing from he the spirit of the invention or from the scope of the appended claims.

I claim:

1. A resilient integral piston seal ring for use in a channel of predetermined dimensions, with respect to said seal ring, in a piston means within a cylinder,
    a. the seal ring comprising a body of substantially rectangular cross section and substantially similar outer and inner walls, one flat sidewall and a bifurcated concentric flange means extending from the other opposite sidewall;
    b. said flange means comprising a pair of substantially similar spaced apart opposed concentric continuous flanges having opposed inner surfaces extending laterally outwardly from said other sidewall and providing a space open to the atmosphere therebetween;
    c. a substantially similar secondary continuous flange projecting outwardly of each inner surface of said flanges facing each other and extending into but not closing the said space open to the atmosphere;
    d. the seal ring body having a deep enlarged annular recess therein enlarged in cross section in respect to and in communication with said continuous space between the flanges;
    e. the body of the seal ring and its flanges both having similar outer and inner surfaces with similar sealing means thereon and extending outwardly and inwardly respectively from the inner and outer surfaces to seal adjacent inner portions of the cylinder and adjacent portions of the bottom wall of the channel respectively; and
    f. the inner opposed surface portion of each flange having opposed continuous secondary inwardly projecting substantially similar flanges thereon serving to maintain the desired resiliency, tension and shape of the seal ring.

2. A ring seal as defined by claim 1, wherein each flange has an inclined outer end surface portion thereof that converges toward one another toward said space, and each flange having a similar outwardly extending sealing portion for sealing engagement with an adjacent portion of a cylinder and with the bottom wall of the channel in the piston.

3. A ring seal as defined by claim 2, wherein each inclined surface portion of each flange merges into a circular bevel edge.

4. A ring seal as defined by claim 3, wherein the bevel edge of s each flange merges respectively into each secondary flange.